United States Patent [19]

Yamauchi

[11] Patent Number: 5,647,467
[45] Date of Patent: Jul. 15, 1997

[54] CLUTCH ASSEMBLY STRUCTURE FOR MULTIPLE DISK CLUTCH

[75] Inventor: Yasuhiro Yamauchi, Fuji, Japan

[73] Assignee: Jatco Corporation, Japan

[21] Appl. No.: 595,829

[22] Filed: Feb. 2, 1996

[30] Foreign Application Priority Data

Feb. 8, 1995 [JP] Japan .................................. 7-043436

[51] Int. Cl.$^6$ .............................. F16D 25/063; F16D 25/10
[52] U.S. Cl. .................................. 192/87.11; 192/70.28; 192/85 AA; 192/106 F
[58] Field of Search ........................... 192/87.11, 87.14, 192/70.27, 70.28, 85 AA, 106 F

[56] References Cited

U.S. PATENT DOCUMENTS

| | | | |
|---|---|---|---|
| 4,732,253 | 3/1988 | Hiramatsu et al. | 192/87.11 |
| 4,741,422 | 5/1988 | Fuehrer et al. | 192/87.11 |
| 5,069,657 | 12/1991 | Taniguchi et al. | 192/87.11 X |
| 5,172,799 | 12/1992 | Iijima et al. | 192/106 F |
| 5,439,088 | 8/1995 | Michioka et al. | 192/85 AA |
| 5,483,850 | 1/1996 | Yamauchi | 192/85 AA X |

Primary Examiner—Andrea L. Pitts
Attorney, Agent, or Firm—Rossi & Associates

[57] ABSTRACT

A clutch assembly structure for a multiple disk clutch is provided which includes a first clutch assembly and a second clutch assembly which are coaxially arranged in parallel with each other, such that the first clutch assembly is located radially outwardly of the second clutch assembly. The second clutch assembly includes a second drum, a second piston slidably received in the second drum, and a second oil chamber formed between the second drum and the second piston. A canceling oil chamber for canceling the centrifugal oil pressure in the second oil chamber is formed within the second piston. In the canceling oil chamber is provided a canceling piston for canceling the centrifugal oil pressure in the second oil chamber. A second return spring consisting of a wave spring is provided between the second piston and the canceling piston. The axial length of the clutch assembly is reduced, thereby rendering the whole multiple disk clutch small-sized.

3 Claims, 4 Drawing Sheets

CLUTCH ASSEMBLY STRUCTURE FOR MULTIPLE DISK CLUTCH

BACKGROUND OF THE INVENTION

1. Field of the Invention

The present invention relates to a clutch assembly structure for a multiple disk clutch used in a power transmission system of an automobile.

2. Description of the Prior Art

A multiple disk clutch has been widely used in a power transmission system of a motor vehicle such as an automobile. Examples of conventional multiple disk clutches are disclosed in Japanese Patent Application Laid-open No.s 63-246544 and 2-3706 for example.

Referring to FIG. 4, the multiple disk clutch disclosed in Japanese Patent Application Laid-open No.63-24655 has a first clutch assembly a and a second clutch assembly b which are coaxially arranged in parallel with each other such that the first clutch assembly a is disposed radially outwardly of the second clutch assembly b. The first clutch assembly a includes a drum c1, clutch disks or plates d1 accommodated in the drum c1, a first piston e1 adapted to press the clutch disks d1 for engagement thereof and a return spring f1 serving to bias the first piston e1 backward i.e. away from the clutch disks d1. Similarly the second clutch assembly b includes a drum c2, clutch disks b2, a second piston e2 and a return spring f2. Both of the first and second clutch assemblies a, b employ coil springs for the return spring f1, f2.

Referring to FIG. 3, the multiple disk clutch disclosed in Japanese Patent Application Laid-open No.2-3706 has a first clutch assembly h and a second clutch assembly i which are coaxially arranged in parallel with each other such that the first clutch assembly h is disposed radially outwardly of the second clutch assembly i. The second piston j2 has a smaller effective diameter than the first piston j1 and is received inside a sliding surface between the first and second pistons j1, j2 so as to reduce the axial distance between the first and second pistons j1, j2. Return spring k is provided for biasing the first piston j1 backward, and the second piston j2 serves to receive or withstand a reaction force from the return spring k.

In the multiple disk clutch disclosed in Japanese Patent Application Laid-open No.63-246544 the use of coil springs for the return springs f1, f2 of both of the first and second clutch assemblies a, b increases axial dimensions of these clutch assemblies a, b resulting in an undesirably large overall size of the clutch.

In the multiple disk clutch disclosed in Japanese Patent Application Laid-open No.2-3706 an oil chamber m containing the second piston j2 and serving to cancel a centrifugal oil pressure which biases the first piston forward has a relatively large volume, and it takes a relatively long time to fill the chamber m with oil. Consequently the centrifugal oil pressure in the oil chamber m is not sufficiently applied to the second piston j2 which as a result does not satisfactorily function to cancel the biasing centrifugal oil pressure.

Further, the second piston j2 as described above and the return spring k consisting of a coil spring are interposed between a hub side wall p supporting clutch disks n and the first piston j1 adapted to press the clutch disks n. In this arrangement, the clutch assembly tends to have a relatively large axial length or dimension resulting in an undesirably increased overall size of the clutch.

SUMMARY OF THE INVENTION

It is therefore an object of the present invention to provide a clutch assembly structure for a multiple disk clutch in which a clutch assembly has a relatively small axial dimension thus rendering the whole clutch small-sized.

The above object may be accomplished according to one aspect of the invention, which provides a clutch assembly structure for a multiple disk clutch comprising: a first clutch assembly and a second clutch assembly which are coaxially arranged in parallel with each other, such that the first clutch assembly is located radially outwardly of the second clutch assembly, the second clutch assembly including a second drum and a second piston slidably received in the second drum, the second piston partially defining a canceling oil chamber for canceling a centrifugal oil pressure in a second oil chamber formed between the second drum and the second piston; a canceling piston provided in the canceling oil chamber for canceling the centrifugal oil pressure in the second oil chamber; and a second return spring comprising a wave spring which is provided between the second piston and the canceling piston.

It is preferable that the second return spring is supported at one end thereof by a shoulder portion formed in a radially inner portion of the second piston, and at the other end by a shoulder portion formed in a radially inner portion of the canceling piston.

The above object may also be accomplished according to a second aspect of the invention, which provides a clutch assembly structure for a multiple disk clutch comprising: a first clutch assembly and a second clutch assembly which are coaxially arranged in parallel with each other, such that the first clutch assembly is located radially outwardly of the second clutch assembly, the second clutch assembly including a second drum, a second piston, driving clutch disks, and a second clutch hub supporting the driving clutch disks, the second clutch hub including a radially extending hub wall portion which is disposed on one side of the clutch assembly axially opposite to the second piston; a canceling piston provided between the hub wall portion and the second piston for canceling a centrifugal oil pressure in a second oil chamber formed between the second drum and the second piston; and a return spring comprising a wave spring for returning the second piston.

The clutch assembly structures constructed as described above have a relatively small axial length or dimension as compared with the structure in which a coil spring is used for the second return spring, thereby rendering the whole multiple disk clutch small-sized.

The use of the wave spring for the second return spring also leads to a reduced volume of the oil chamber for canceling the centrifugal oil pressure, thereby reducing the time required to fill this chamber with oil, and thus ensuring canceling of the centrifugal oil pressure applied to the second piston.

In the clutch assembly structure according to the second aspect of the invention, the radially extending hub wall portion of the second clutch hub supporting the driving clutch disks of the second clutch assembly is supported on the side of the clutch assembly axially opposite to the second piston. Further, the piston for canceling the centrifugal oil pressure is interposed between the hub wall portion and the second piston. In this arrangement, the use of the wave spring for the return spring for the second piston can reduce the axial length of the clutch assembly which eventually leads to reduction in the overall size of the clutch.

BRIEF DESCRIPTION OF THE DRAWINGS

The invention will be described in greater detail with reference to a certain preferred embodiment thereof and the accompanying drawings wherein.

DETAILED DESCRIPTION OF THE PREFERRED EMBODIMENT

Figure 1:
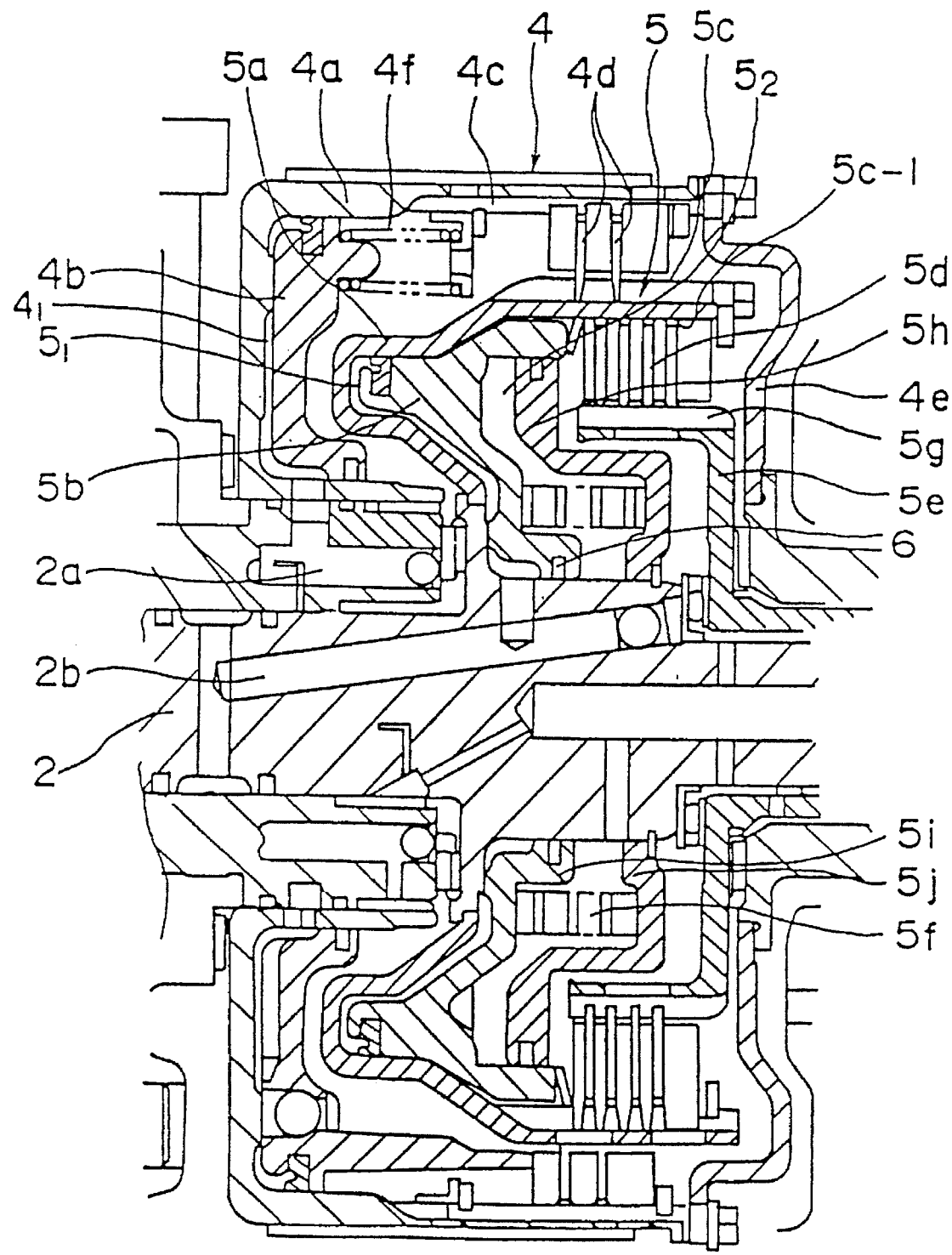
FIG. 1 is a cross sectional view showing clutch assemblies of a multiple disk clutch according to one embodiment of the present invention.
Figure 2:
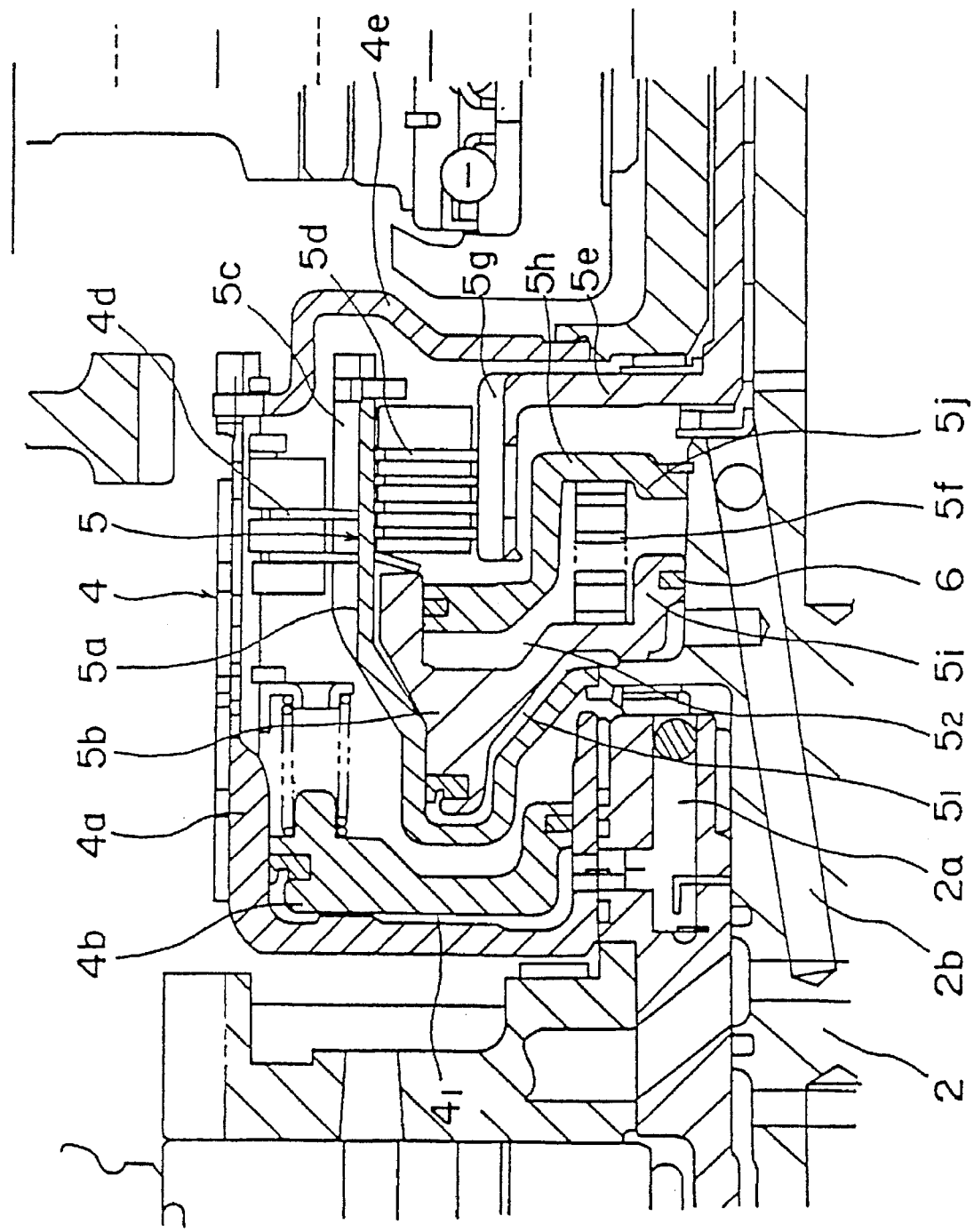
FIG. 2 is an enlarged view showing a principal part of the clutch assemblies of the multiple disk clutch of FIG. 1.
Figure 3:
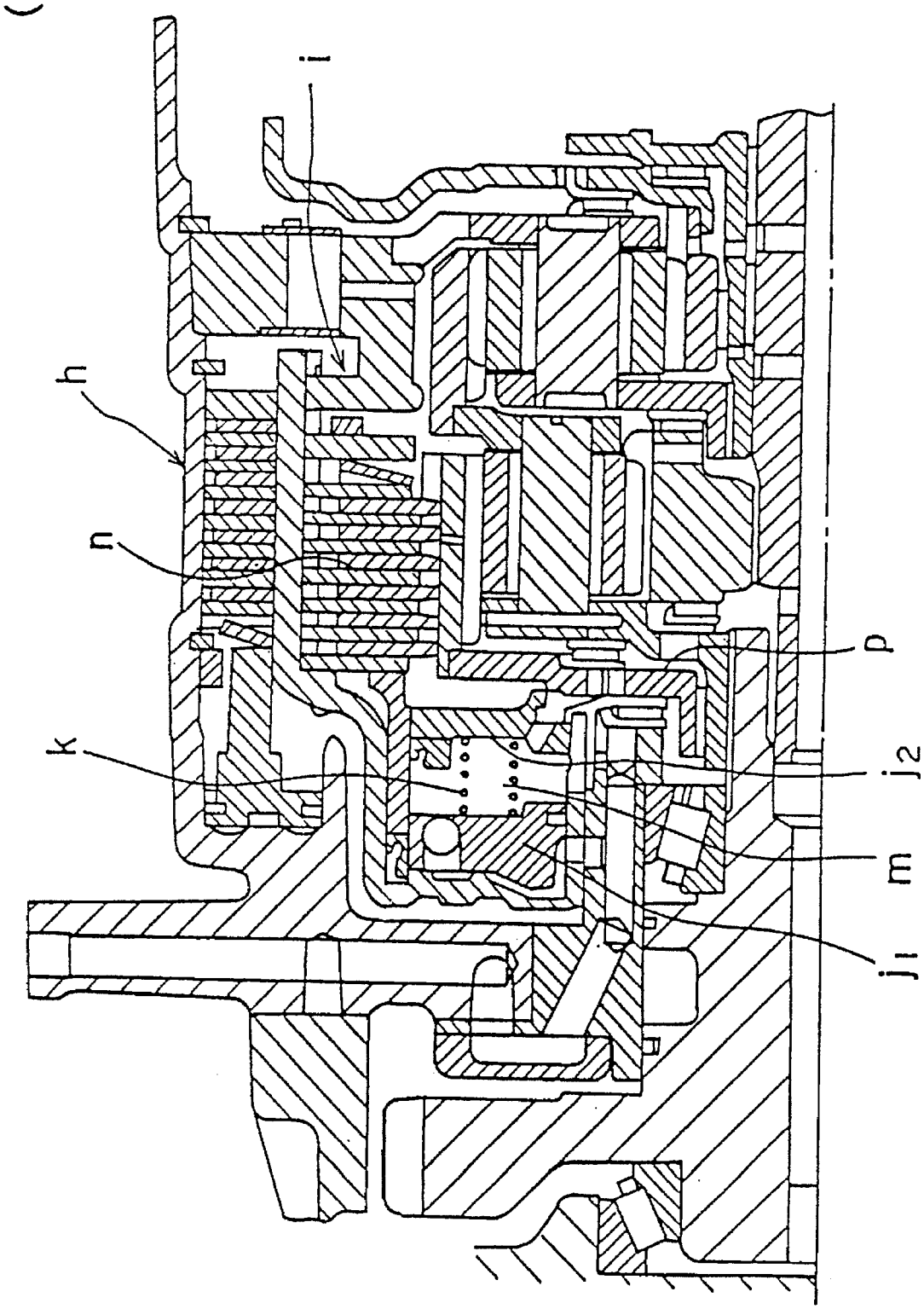
FIG. 3 is a cross sectional view of a conventional multiple disk clutch.
Figure 4:
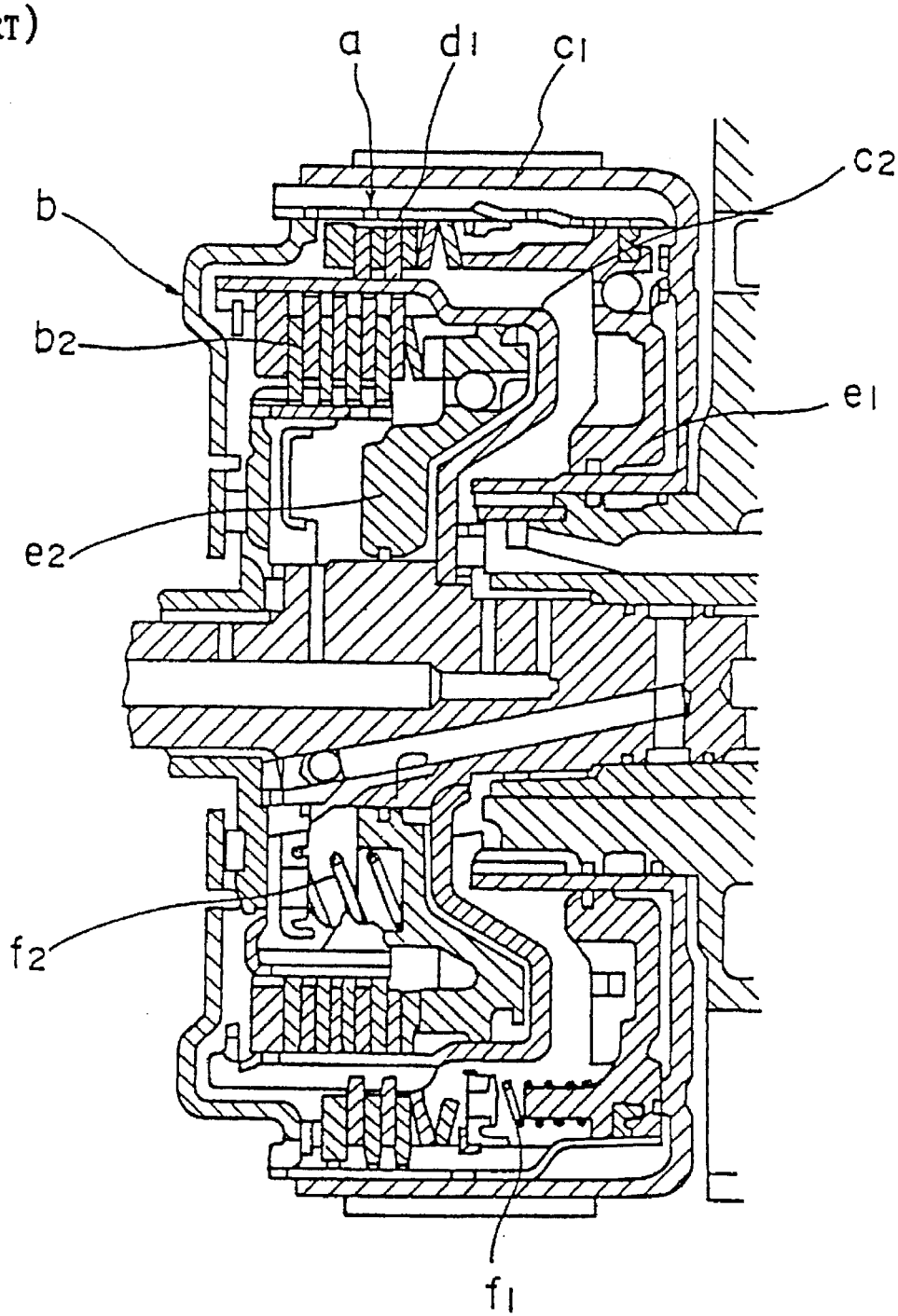
FIG. 4 is a cross sectional view of another conventional multiple disk clutch.

There will be described in detail one preferred embodiment of the present invention, referring to the accompanying drawings in which FIG. 1 is a cross sectional view of a multiple disk clutch and FIG. 2 is an enlarged view showing a principal part of the multiple disk clutch.

Referring to FIGS. 1 and 2, reference numeral 2 denotes an input shaft, and a first clutch assembly 4 and a second clutch assembly 5 are disposed in parallel with each other to surround the input shaft 2, such that the first clutch assembly 4 is located radially outwardly of the second clutch assembly 5.

The first clutch assembly 4 includes a first drum 4a which is rotatably supported by the input shaft 2, and a first piston 4b which is received in the first drum 4a such that the piston 4b is slidable in the axial direction of the input shaft 2.

The first drum 4a is formed at its inner circumferential surface with a first spline 4c, while a second drum 5a of the second clutch assembly 5 which is received in the first drum 4a is formed at its outer circumferential surface with a second spline 5c. A plurality of first clutch disks or plates (driving plates and driven plates) 4d are provided for alternate engagement with the first and second splines 4c, 5c.

The second drum 5a is secured to the input shaft 2, and is adapted to transmit rotation of the input shaft 2 to the first drum 4a, through the first clutch disks 4d indicated above. The rotation transmitted to the first drum 4a is then transmitted to a first sun gear of a planetary transmission (not shown), through a shell connector 4e that is positioned to cover an opening of the first drum 4a.

In FIG. 1, reference numeral 4f denotes a return spring which consists of a coil spring. This return spring 4f biases the first piston 4b backward, i.e., in the direction away from the first clutch disks 4d.

On the other hand the second clutch assembly 5 has a first oil chamber 51 which generates an operating oil pressure within the second drum 5a fixed to the input shaft 2. The second piston 5b is slidably received in this first oil chamber 51.

Between the inner circumferential surface of the second piston 5b and the outer circumferential surface of the input shaft 2, there is provided a seal ring 6 for preventing leakage of the oil supplied to the first oil chamber 51 through an oil passage 2b formed in the input shaft 2.

The second drum 5a is formed at its inner circumferential surface with a third spline 5c-1, and a second clutch hub 5e rotatably supported by the input shaft 2 is formed at its outer circumferential surface with a fourth spline 5g. A plurality of second clutch disks or plates (driving plates and driven plates) 5d are provided for alternate engagement with the third and fourth splines 5c-1 and 5g. Rotation transmitted from the second drum 5a to the second clutch hub 5e through the second clutch disks 5d is transmitted to a second sun gear (not shown) of the planetary transmission.

Further, a second oil chamber 52 adapted for canceling a centrifugal oil pressure as described later is formed in the second piston 5b, and a third piston 5h adapted for canceling the centrifugal oil pressure is received in the oil chamber 52. A second return spring 5f is interposed between the third piston 5h and the second piston 5b.

The second return spring 5f consists of a wave spring, and is supported at one end thereof by a shoulder portion 5i formed in a radially inner portion of the second piston 5b, and at the other end by a shoulder portion 5j formed in a radially inner portion of the third piston 5h.

The multiple disk clutch constructed as described above will be operated in the following manner. Initially, power of an engine (not shown) received from the input shaft 2 is transmitted to the second drum 5a of the second clutch assembly 5.

To connect the first clutch assembly 4, an oil pressure is supplied to an oil chamber 41 formed between the first drum 4a and the first piston 4b, through an oil passage 2a formed in the input shaft 2, so that the first piston 4b is pushed to the right, i.e., toward the second drum 5a, whereby the driving and driven plates of the first clutch disks 4d which are arranged between the first and second drum 4a,5a are pressed against and engage with each other. Thus, the second drum 5a outputs or transmits the power transmitted to the second drum 5a to the first sun gear of the planetary transmission through the first drum 4a and the shell connector 4e.

To connect the second clutch assembly 5, an oil pressure is supplied to the first oil chamber 51 in the second drum 5a, through the oil passage 2b formed in the input shaft 2, so that the second piston 5b is pushed or moved to the right, whereby the driving and driven plates of the second clutch disks 5d are pressed against and engage with each other. Thus, the power transmitted to the second drum 5a is transmitted to the second clutch hub 5e through the second clutch disks 5d, and then transmitted from the second clutch hub 5e to the second sun gear of the planetary transmission.

During operation of the multiple disk clutch, a centrifugal oil pressure is generated within the second oil chamber 52 partially defined by the third piston 5h, so as to push or move the second piston 5b to the left, with a force corresponding to a centrifugal oil pressure generated within the first oil chamber 51, thereby to cancel the centrifugal oil pressure in the chamber 51. This makes it possible to cancel or eliminate the centrifugal oil pressure undesirably remaining in the first oil chamber 51 when the clutch is released. When the oil pressure in the oil chamber 51 is released, therefore, the second piston 5b is readily returned to the original position due to the biasing force of the return spring 5f.

As described above, the use of the wave spring for the return spring for the second piston of the second clutch assembly according to the present invention can reduce the axial length of the multiple disk clutch, as compared with the conventional clutch using a coil spring as the return spring for the second piston, thus rendering the whole clutch relatively small-sized.

The use of the wave spring also leads to a reduced volume of the oil chamber for canceling the centrifugal oil pressure, thereby reducing the time required to fill this chamber with oil, and thus ensuring canceling of the centrifugal oil pressure applied to the second piston.

In the multiple disk clutch of the illustrated embodiment, the second clutch hub supporting the driving clutch disks or plates of the second clutch assembly has a radial wall portion which is supported on the side of the clutch axially opposite to the second piston, with the third piston for canceling the centrifugal oil pressure interposed between the hub wall portion and the second piston. The use of the wave spring for the return spring which is supported by the third piston to bias the second piston can reduce the axial length of the clutch assembly, which eventually leads to reduction in the overall size of the clutch.

What is claimed is:

1. A clutch assembly structure for a multiple disk clutch, comprising:

a first clutch assembly and a second clutch assembly which are coaxially arranged in parallel with each other, such that the first clutch assembly is located radially outwardly of the second clutch assembly, said second clutch assembly including a second drum, and a second piston slidably received in the second drum, said second piston partially defining a canceling oil chamber for canceling centrifugal oil pressure in a second oil chamber formed between said second drum and said second piston;

a canceling piston provided in said canceling oil chamber, for canceling the centrifugal oil pressure in said second oil chamber; and a second return spring comprising a wave spring, which is provided between said second piston and said canceling piston.

2. A clutch assembly structure as defined in claim 1, wherein said second piston includes a shoulder portion formed in a radially inner portion thereof, and said canceling piston includes a shoulder portion formed in a radially inner portion thereof, said return spring being supported at one end thereof by said shoulder portion of the second piston, and at the other end thereof by said shoulder portion of the canceling piston.

3. A clutch assembly structure for a multiple disk clutch, comprising:

a first clutch assembly and a second clutch assembly which are coaxially arranged in parallel with each other, such that the first clutch assembly is located radially outwardly of the second clutch assembly, said second clutch assembly including a second drum, a second piston, driving clutch disks, and a second clutch hub supporting the driving clutch disks, said second clutch hub including a radially extending hub wall portion which is disposed on one side of the clutch assembly axially opposite to said second piston;

a canceling piston provided between said hub wall portion and said second piston, for canceling a centrifugal oil pressure in a second oil chamber formed between said second drum and said second piston; and a return spring comprising a wave spring, for returning said second piston.

* * * * *